United States Patent [19]

Brown et al.

[11] 4,453,062
[45] Jun. 5, 1984

[54] PUSHBUTTON SWITCH AND INTEGRAL LAMP FOR TELEPHONE DIALS

[75] Inventors: Michael Brown, Nepean; David W. Johnson, London, both of Canada

[73] Assignee: Northern Telecom Limited, Montreal, Canada

[21] Appl. No.: 450,427

[22] Filed: Dec. 16, 1982

[51] Int. Cl.³ ............................................. H01H 9/16
[52] U.S. Cl. ................................ 200/314; 200/153 T; 200/332; 179/81 C
[58] Field of Search ............... 200/310, 313, 314, 316, 200/153 T, 330, 340, 303, 332, 335; 362/24; 179/81 C, 99 LS

[56] References Cited

U.S. PATENT DOCUMENTS

| | | | |
|---|---|---|---|
| 2,769,069 | 10/1956 | Christy et al. | 200/314 |
| 2,924,692 | 2/1960 | Campe et al. | 200/153 T |
| 2,925,482 | 2/1960 | Bonanno | 200/317 |
| 3,155,806 | 11/1964 | Klingenberg | 200/315 |
| 3,440,429 | 4/1969 | Murphy et al. | 200/314 |
| 3,689,724 | 9/1972 | Labude et al. | 200/330 |
| 3,732,388 | 5/1973 | Taylor | 200/303 |
| 4,126,774 | 11/1978 | Gossling | 200/314 |

Primary Examiner—John W. Shepperd
Attorney, Agent, or Firm—Sidney T. Jelly

[57] ABSTRACT

A combined pushbutton and lamp for a telephone dial has two housings connected together to form an enclosure for a lamp and a switch. A pivoted pushbutton is mounted on the housings, with a center part over the lamp, pivot members on one side of the center part fitting on pivots or one of the housings and a lever extending on the other side of the center part and actuating the switch. A bezel member snaps over the center part of the pushbutton and holds it assembled to the housings. The lamp extends up into the center part of the pushbutton which has restricted movement, the lever amplifying this movement to actuate the switch.

10 Claims, 4 Drawing Figures

PUSHBUTTON SWITCH AND INTEGRAL LAMP FOR TELEPHONE DIALS

This invention relates to a pushbutton switch having an integral lamp, and which is suitable for installing in telephones and particularly in telephones with a pushbutton key pad or dial.

Telephone sets are often provided with one or more pushbuttons additional to the key pad or dial itself. Thus there may be a special pushbutton to be activated to access the telephone set to a specific feature of the telephone system. Also, it is often the case that an indicator lamp is provided, to indicate that a message is waiting, or some other reason. Additional buttons and lamps require extra holes in the facia of the telephone set. A problem also exists in that the power available is low and a very low luminance results. A conventional filament lamp is usually directly soldered on to a printed circuit board and is not readily replaced.

The present invention provides a combined pushbutton switch and lamp assembly, thus reducing the number of holes required in the facia. As a further feature a push-in neon lamp is used. This requires low power. Although neon lamps are more fragile than filament lamps, the neon lamp is easily replaceable. The lamp is mounted very close to the top of the pushbutton, but although only very limited travel of the button is thus available, the arrangement of the assembly is such as to give sufficient travel at the actuating position on the switch.

The assembly comprises two housing members which clip together, positioning and holding a switch between them. The lamp is also held between the housing members. A pushbutton is provided at one side on pivot members on the housing members, the pushbutton being positioned over the lamp and also having a lever extending on the side remote from the pivot to an actuating member of a switch. A bezel member fits over the pushbutton and snaps into position on the housing members.

The invention will be readily understood by the following description of an embodiment, by way of example, in conjunction with the accompanying drawings, in which.

Figure 1:
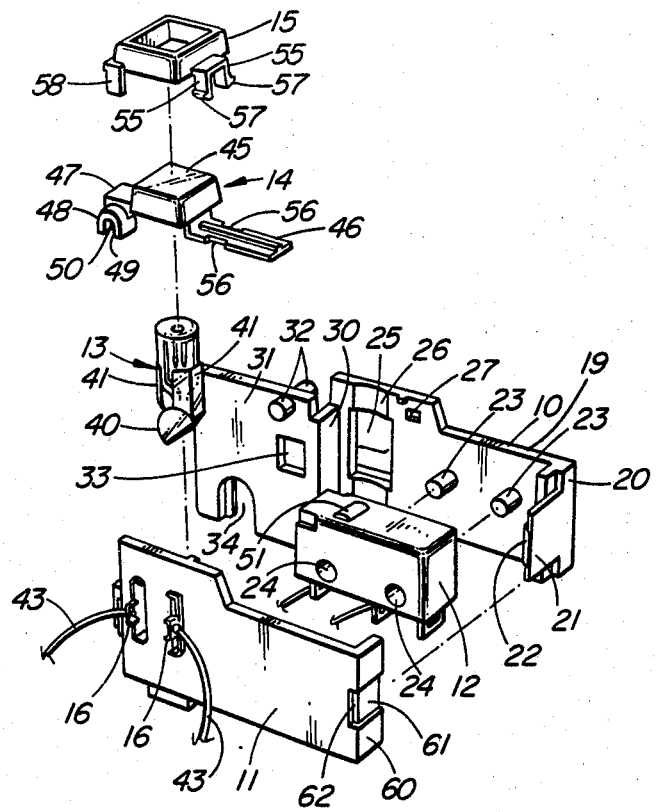
FIG. 1 is a perspective exploded view of a pushbutton switch assembly.

FIG. 1 illustrates a lighted pushbutton switch assembly, in accordance with the invention, and in particular illustrates the major parts of the assembly. There are, first and second housing members 10 and 11, a switch 12, a neon lamp 13, a pushbutton 14 and a bezel member 15. Also seen are the outer ends 16 of spring terminals into which the lamp 13 is pushed.

Figure 3:
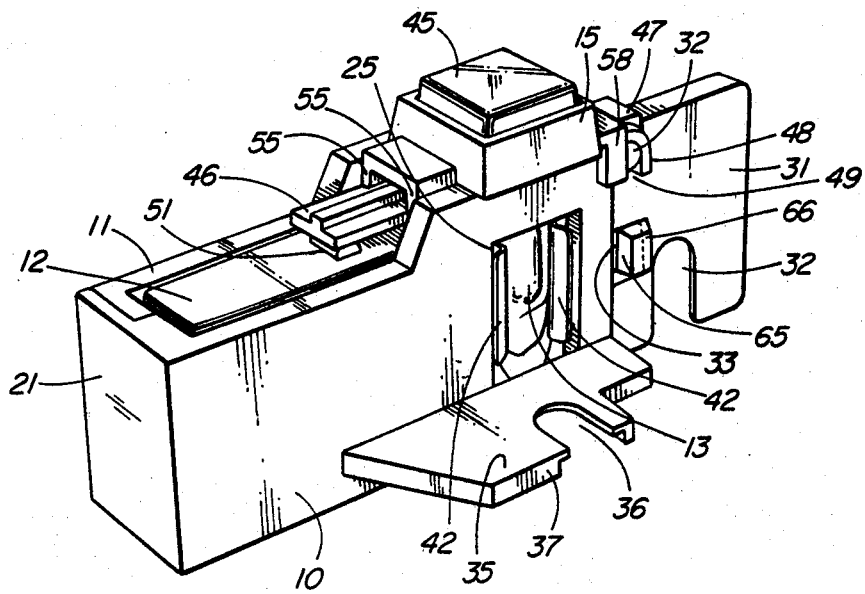
FIG. 3 is a perspective view of the assembly of FIG. 2, looking on the other side of the housing.

Housing member 10 has a forwardly extending web 19 with a laterally extending web 20 at one end, the web 20 having a portion 21 of reduced width and thickness extending beyond the main portion. At the end of portion 21 is rib 22 projecting inward. Two laterally spaced cylindrical projections 23 on the inner surface of the member 10 position the switch 12 by extending into holes 24 which extend through the switch. An aperture 25 is formed in the member 10, on the side of the projections 23 remote from the web 20. This aperture receives the ends of the spring terminals holding the lamp 13, as seen in FIG. 3. The inner surface of the member 10 is slightly concave, at 26, to position the lamp 13. Adjacent to the aperture 25 is a small recess 27, the purpose of which will be described later.

The housing member 10 has another laterally projecting web 30 on the side of aperture 25 remote from web 20. The web 30 projects inward a short distance and a further web 31 extends rearwards from the inner end of web 30. At the top of the web 31 adjacent to its junction with web 30, are two cylindrical pivot members 32, one on each side of web 31. Below the pivot members 32 is a further aperture 33. A slot 34 extends up from the bottom surface of web 31. The pivot members 32 provide a pivotal mounting for the pushbutton 14, as described later.

On the rearward side of the housing member 10, as seen in FIG. 3, is a projecting web 35, with a slot 36 extending in from the outer edge 37. The webs 31 and 35, with slots 32 and 36, provide alternative means for mounting the assembly in a telephone set or other apparatus.

Figure 4:
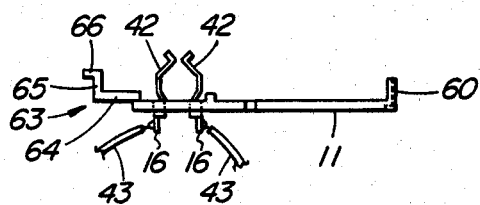
FIG. 4 is a top plane view of one of the housing members, as is seen from the outside in FIG. 1.

The lamp 13 is a neon lamp having a base 40 of insulating material which holds the lamp envelope itself and two contact members 41 assembled together. The lamp is inserted in the spring terminals, seen at 42 in FIG. 4, by pushing down into the terminals. Electrical connections to the lamp are made by conductors 43 attached to the ends 16 of the terminals 42.

The pushbutton 14 has three basic parts. A central part 45 is of the form of a normal pushbutton as in telephone key pads or dials. Extending from one side of the central part is a lever 46 and extending from the opposite side of the central part is a short web 47. Depending from the web 47 are two generally semi-circular bosses 48 having slots 49 which have semi-circular end surfaces 50. The bosses 48 are spaced apart the thickness of the web 31 of housing member 10 and the slots 49 fit on the pivot members 32. The lever extends over the switch 12, so as to be able to actuate the switch actuating member 51. The central part 45 extends upward above the lever 46 and web 47 and is hollow, fitting over the top of the lamp 13.

The bezel member 15 is a close sliding fit over the central part 45 of the pushbutton 14. On one side two legs 55 extend downwards, the legs parallel and spaced apart to pass over the lever 46 of the pushbutton 14. The lever 46 is reduced in width slightly by recesses 56, the legs 55 positioned in the recesses. At the lower ends of the legs 55 are outwardly extending ribs 57. On an opposite side of the bezel member, at each corner, a further leg 58 extends downward.

The housing member 11 is similar in many ways to the member 10. An inwardly extending web 60 is at one end, in opposition to web 20 on member 10. However, this web 60 has a shallow groove 61 which extends for a short distance rearwards at 62. At the other end of the member 11 is a hooked projection 63, of a somewhat Z formation, having a first web portion 64, a second web portion 65 extending inwards and the end portion 66 extending parallel to and spaced inward of the first portion 64. The three portions form a hook which passes through the aperture 33 of housing member 10. When the two housing members are assembled together, this hook projection 63 is first inserted into the aperture 33, and then the housing members pivotted together. The portion 21 of web 20 of member 10 overlaps the web 60 of member 11 being deflected outward until the rib 22 snaps into the portion 62 of the groove 61. A shallow projection on the inside of the web portion 21 fits into the groove 61 and provides location between the two housing members at that end. The pivotting of the two housing members together rotates the projection 63 in the aperture 33, until the second portion 65 of the projection extends through the aperture and the third portion extends on the outside of the web 31. The first portion 64 is in contact with the inside of web 31 and thus the projection 63 and aperture 33 provide location and locking of the two housing members together at that end. A recess is provided, positioned to be opposite recess 27 in member 10.

When the two housing members are assembled together, the terminals 42 are already inserted in member 11. The switch 12 is positioned on the projections 23. As the housing members snap together, the ends of the terminals 42 enter the aperture 25. As the lamp 13 is pushed in, the terminals move apart but a limit to the movement of the ends of the terminals is provided by the sides of the aperture 25. This is seen in FIG. 3.

After the housing members are assembled together the pushbutton 14 is placed in position, the bosses 45 and slots 49 fitting over the pivot members 32 and the lever 46 resting on the switch actuating member 51. The bezel member is then assembled to the housing member. The legs 58 are positioned against the end of the main part of member 10 and the end of member 11. The legs are of L-shaped cross-section and fit around the ends of the members. The legs 55 are pushed down inside the housing members, passing through the recesses 56 on the lever 46 of the pushbutton. When the bezel is fully assembled the webs 57 snap into the recesses 27 in the housing members. The bezel member thus holds the pushbutton in position.

The sides of the pushbutton overlap slightly the top edges of the housing member. When assembled, there is a small clearance between the pushbutton and the top edges of the housing members, the pushbutton held up by the switch actuating member 51, which is resiliently biased upward. Pressure on the pushbutton depresses the actuator 51 but the movement of the button is limited by the eventual contact between pushbutton and housing members.

Figure 2:
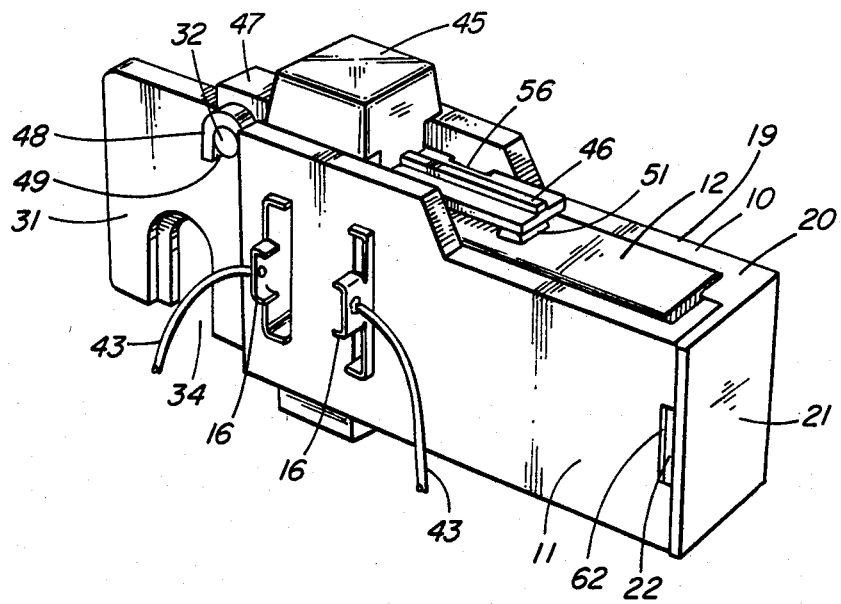
FIG. 2 is a perspective view of an assembled assembly looking on the same side of the housing as in FIG. 1.

The assembly of switch 12, lamp 13, housing members 10 and 11 and pushbutton 14 is illustrated in FIG. 2, the bezel member omitted for clarity, the assembly viewed in the same direction as FIG. 1. FIG. 3 illustrates the assembly of the housing members 10 and 11, switch 12, lamp 13, pushbutton 14 and the bezel member 15. The assembly is viewed from the opposite side to that of FIGS. 1 and 2. The engagement of this projection or hook 63 can be seen in FIG. 3.

The pushbutton is molded of translucent material—usually colored. Installed in a telephone, the bezel member would extend up through the telephone set facia, together with the central part 45 of the pushbutton, and have the appearance of a conventional pushbutton.

The limited movement of the pushbutton 14 enables the top of the lamp to be positioned very close to the top of the central part 45 of the pushbutton. However, with the pushbutton pivotting on the pivot members 32 at one side of the part 45 and the lever 46 extending on the other side, the movement available at the switch actuating member 51 is increased relative to the movement of part 45.

What is claimed is:

1. A pushbutton switch and integral lamp for telephone dials comprising:
   first and second housing members connected together, to form an enclosure;
   two spring terminals mounted in one of said housing members and extending across to the other of said housing members;
   a lamp positioned and held between said spring terminals;
   a switch positioned and held between said housing members;
   a pushbutton pivotally mounted on a top surface of one of said housing members and including a lever extending over said switch for actuation of said switch on depression of said pushbutton; and
   a part of said pushbutton being translucent and extending over said lamp.

2. A switch as claimed in claim 12, the first housing member comprising two webs extending forward and rearward respectively from a laterally extending web connecting a rear end of the forward web and a front end of the rearward web; the webs offset in parallel planes; a further laterally extending web at the forward end of said forward web overlapping the forward end of the second housing member; and a rib at the end of the further laterally extending web engaged in a recess in the forward end of said second housing member, to hold said housing members together at a front end.

3. A switch as claimed in claim 2, including a hooked projection at a rear end of said second housing member; an aperture in said rearwardly extending web of said first housing member, said hooked projection engaged through said aperture to retain said housing members together at a rear end.

4. A switch as claimed in claim 2, including a pivot member extending on each side of the rearwardly extending portion of said first housing, said pushbutton mounted on said pivot members.

5. A switch as claimed in claim 4, said pushbutton comprising a central part; a rearwardly extending web having bosses on either side and slots in said bosses, said slots fitted over said pivot members; said lever on said pushbutton extending forward from said central part.

6. A switch as claimed in claim 5, said central part of said pushbutton projecting upward, for engagement by a user, and a bezel member fitted over said central part, the central part extending through an aperture in said bezel member.

7. A switch as claimed in claim 6, said bezel member including two legs extending downward at a rear end, said legs extending down outside said housing members, and two further legs extending down at a front end of the bezel member, said further legs extending down on either side of said lever inside said housing members, said further legs each including an outwardly projecting rib at its lower end, said ribs engaging in recesses on the inside of each housing member to retain said bezel member and said pushbutton in position.

8. A switch as claimed in claim 5, said central part of said pushbutton hollow, said lamp positioned beneath said central part and extending upward into said central part.

9. A switch as claimed in claim 2, including two projections extending from an inner surface of said forwardly extending portion of said first housing, said projections extending into apertures in said switch to position and hold said switch.

10. A switch as claimed in claim 1, said two spring terminals mounted at one end in said first housing, the opposite ends of said spring terminals positioned in an aperture in said second housing, said aperture restricting separation of said spring terminals.

* * * * *